United States Patent
Asmus

[15] 3,699,677
[45] Oct. 24, 1972

[54] ANTI-COAST VALVE ADDITION TO THE MANUAL FEATHERING CONTROL FOR A HYDROSTATIC TRANSMISSION

[72] Inventor: Rodger W. Asmus, Downers Grove, Ill.

[73] Assignee: International Harvester Company, Chicago, Ill.

[22] Filed: Nov. 2, 1970

[21] Appl. No.: 86,365

Related U.S. Application Data

[63] Continuation of Ser. No. 14,750, Feb. 24, 1970, abandoned, which is a continuation of Ser. No. 731,589, May 23, 1968, abandoned.

[52] U.S. Cl. ..................................60/53 R, 60/53 A
[51] Int. Cl. ..............................................F16d 31/02
[58] Field of Search.........60/53 A, 53 R, 19; 91/461; 180/66

[56] References Cited

UNITED STATES PATENTS

| | | |
|---|---|---|
| 2,465,758 | 3/1949 | Sedgwick et al.........60/52 HF |
| 2,789,542 | 4/1957 | Vanderkaay...........60/53 R X |
| 3,126,707 | 3/1964 | Hann et al. ................60/53 A |
| 3,199,286 | 8/1965 | Anderson...............60/53 R X |
| 3,284,999 | 11/1966 | Lease....................60/53 A X |
| 3,360,933 | 1/1968 | Swanson et al. .......60/53 A X |
| 3,383,857 | 5/1968 | Rajchel et al. .........60/53 A X |
| 3,393,509 | 7/1968 | Kempson..................60/53 R |
| 3,398,531 | 8/1968 | Swanson et al. ...........60/53 A |

*Primary Examiner*—Edgar W. Geoghegan
*Attorney*—Floyd B. Harman

[57] ABSTRACT

A hydraulic control system for a hydrostatic transmission in which are provided valving means which can be selectively positioned corresponding to forward, neutral or reverse drive of the transmission and including means for dumping excess fluid pressure from the fluid pressure circuit in order to prevent damage to the transmission and under certain conditions to prevent overspeeding of the transmission to further prevent damage. Means are provided whereby fluid flow in the hydrostatic loop can be bypassed from its normal drive path in the transmission, through the valve means provided.

23 Claims, 2 Drawing Figures

FIG. 1

INVENTOR
RODGER W. ASMUS

ATT'Y

Fig. 2

Inventor:
Rodger W. Asmus

ANTI-COAST VALVE ADDITION TO THE MANUAL FEATHERING CONTROL FOR A HYDROSTATIC TRANSMISSION

This application is a continuation of Ser. No. 14,750, filed Feb. 24, 1970, now abandoned, which was a continuation of Ser. No. 731,589, filed May 23, 1968, now abandoned.

BACKGROUND OF THE INVENTION

This invention relates to hydrostatic transmissions but more particularly to control means for preventing over-speeding and additionally providing feathering control of a transmission of this type when incorporated in a vehicle and an anti-coast control feature.

It is well known that hydrostatic transmissions are frequently employed in the power train for transmitting drive between the engine and propulsion wheels of a vehicle. However, despite the increasing use of hydrostatic transmissions in vehicles such arrangements continue to encounter drawbacks and objectionable characteristics. One of the difficulties in such transmissions is the accidental overspeeding of such transmissions when, for instance, the vehicle is propelled by the force of gravity down an incline, which may often be accentuated by the weight being carried or towed by the vehicle. In such cases, the momentum sometimes is sufficient to cause the dynamic braking effect of the transmission to be overcome with the result that the motor component of the motor-pump transmission unit tends to drive the pump component thereof as well as the engine of the vehicle at speeds in excess of those for which such units are designed, and ultimately causing severe damage thereto.

Another difficulty encountered has been in providing satisfactory feathering operation for such transmissions particularly with respect to providing an inching feature in farm tractor vehicles so as to aid in the maneuvering thereof into positions for attaching implements or trailers.

Inventions directed to these problems have been disclosed in pending U.S. Pat application Ser. No. 585,902 filed Oct. 11, 1966, now U.S. Pat. No. 3,398,531, and assigned to the same assignee as the present invention. The present application is a further improvement which may be utilized in conjunction with the hydrostatic transmission control system disclosed in the above pending U.S. patent application.

It is an object of the present invention therefore, to provide improved automatic overspeed control means for a hydrostatic transmission when the flow of power therethrough is reversed in direction from that of normal operation.

A further object of this invention is to provide in conjunction with a vehicle hydrostatic transmission overspeed control means and feathering control means, an anti-coast device which will prevent overspeeding of the transmission when the vehicle with which the transmission is associated is in a coasting situation.

Another object of this invention is to provide an anti-coast device which, when associated with the hydrostatic transmission, will prevent disengagement of drive through the transmission when the vehicle is in a coasting situation, thereby preserving the dynamic braking effect.

A still further object of this invention is to provide valve means arranged to prevent the complete venting of motoring pressure in the hydraulic control system of the transmission while the vehicle is in a coasting situation to preserve a necessary amount of dynamic braking effect.

Another object of this invention is to provide in conjunction with a vehicle hydrostatic transmission overspeed control means and feathering control means, an anti-coast valve device which will under certain conditions of vehicle operation prevent the feathering control means from being operative to vent the hydraulic system.

The foregoing and other objects and features of the invention will become apparent as the disclosure is more fully made in the following detailed description of a preferred embodiment of the invention as illustrated in the accompanying sheets of drawings in which:

Figure 1:
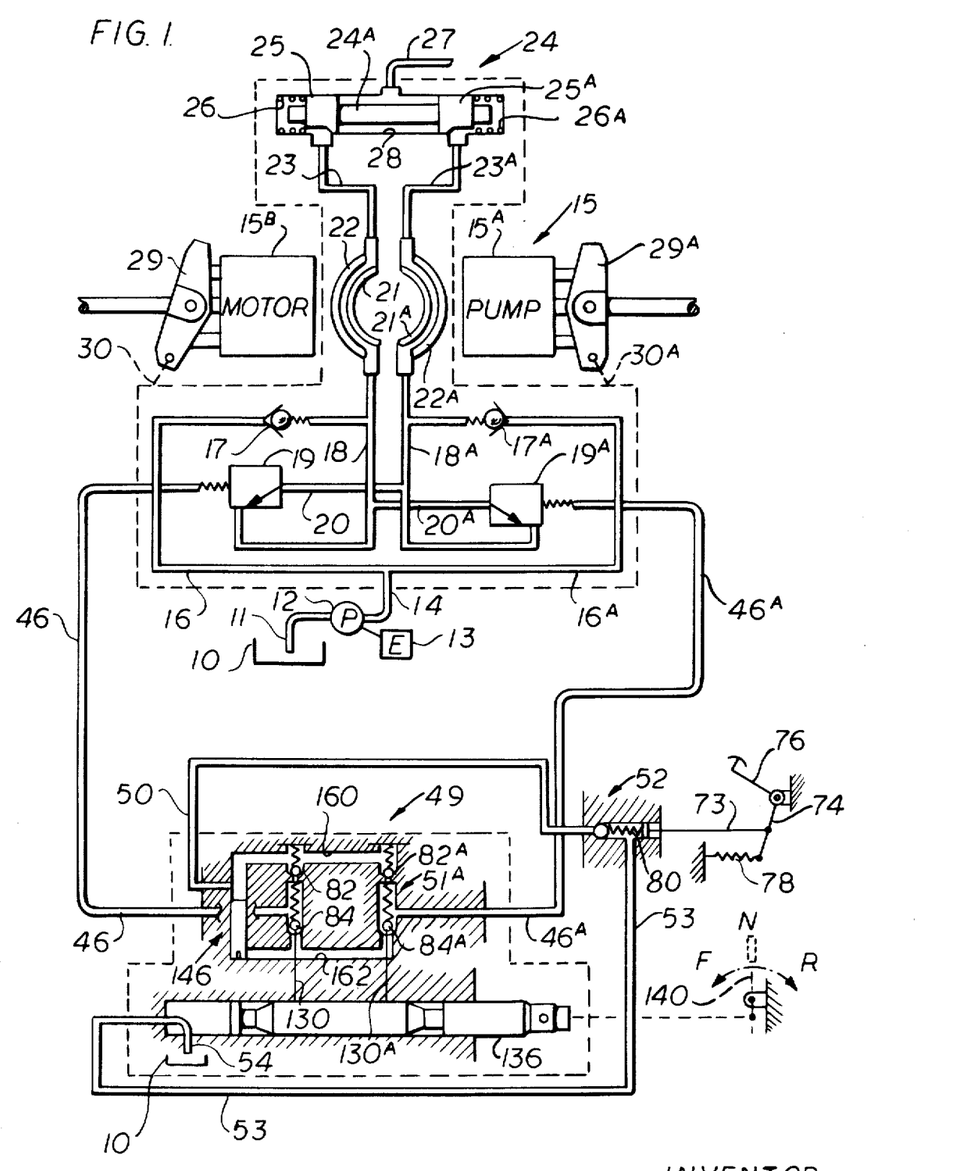
FIG. 1 is a diagrammatic view illustrating mechanical and fluid circuit features of a transmission embodying the present invention.

Referring now to the drawings, where there is presented in FIG. 1 a general representation of a portion of a hydrostatic transmission system of the type customarily incorporated in vehicles for propulsion thereof, 10 designates a fluid reservoir which is connected by a conduit or passage 11 with the inlet of a fluid supply pump 12 which may be driven by suitable means such as the engine indicated at 13. An outlet of pump 12 opens into a conduit 14 and the latter in turn connects with an inlet of a motor-pump unit indicated generally by reference numeral 15. This portion of the system supplies the charge or makeup fluid to the motor-pump unit from pump 12 and together with the outlet circuit of said unit is commonly referred to as the charge circuit. It will be understood, of course, that the pump component 15a thereof will be operatively connected to suitable driving means such as the engine or motive power of an associated vehicle (not shown) while the motor component 15b will be suitably connected to other equipment, such as the drive train of a vehicle (not shown) to drive said vehicle.

Since the motor pump unit 15 is generally conventional, such, for example, as the hydraulically interconnected and back-to-back arranged motor-pump unit described in the Hann et al. U.S. Pat. No. 3,126,707, no extensive elaboration of the details or construction thereof need be included herein. Conduit 14 connects into said motor-pump unit by way of a pair of conduits 16, 16a (FIG. 1) which connect into respective check valves 17, 17a of conventional construction while the outlet sides of the latter valves open into the respective conduits 18, 18a which, in turn, connect at one end thereof into the respective pilot-operated high pressure relief valves 19, 19a. The outlets of said high pressure relief valves are cross-connected by conduits 20a, 20 with the respective inlets of valves 19a, 19 so as to bypass a large flow of fluid therebetween upon opening of either one of these relief valves as a result of an excessively high pressure in the associated circuit. The opposite ends of conduits 18, 18a communicate with the kidney-shaped ports 21, 21a and 22, 22a of the respective pump and motor components of said unit, and additional conduits 23, 23a communicating with the respective kidney ports connect into opposite ends of a shuttle valve 24. Said shuttle valve, which is of conventional construction, may include a spool 24a, having lands 25, 25a at opposite ends thereof, and centering springs 26, 26a whereby said spool is maintained centered when the transmission is operating in its neutral position. An outlet or discharge conduit 27 communicates with the chamber 28 formed between the lands 25, 25a. When the valve 24 is subjected to a pressure differential, the spool 24a is shifted to block the high pressure conduit and to communicate the low or charge pressure conduit with the chamber 28. The fluid discharged from the conduit 27 is utilized to cool the pump-motor unit.

It will be appreciated, of course, that valves 17, 17a and 19, 19a together with pump and motor kidney ports 21, 21a and 22, 22a and shuttle valve 24 may be fashioned as part of the motor-pump unit 15 whereupon many of the conduits designated as interconnecting these components may be constituted as fluid passages formed in the casing, housing or valve plate members rather than as separate or individual elements.

The swash plates 29, 29a of the respective motor and pump components of the unit 15 may be operatively connected for displacement by suitable means such as indicated schematically at 30, 30a, with suitable servos and servo actuating means (not shown) for controlling the displaced positions of said plates according to well known principles of operation of such mechanisms. For purposes of simplification of the instant application, such servo displacement control means as well as other components of the transmission system not particularly pertinent to the present invention are omitted, but since they are substantially identical to the disclosure in co-pending U.S. Pat. applications Ser. No. 548,184, now U.S. Pat. No. 3,360,934, and Ser. No. 585,787, now U.S. Pat. No. 3,392,526, and assigned to the same assignee as the present invention, reference may be had thereto for a further and more comprehensive elaboration thereof.

Figure 2:
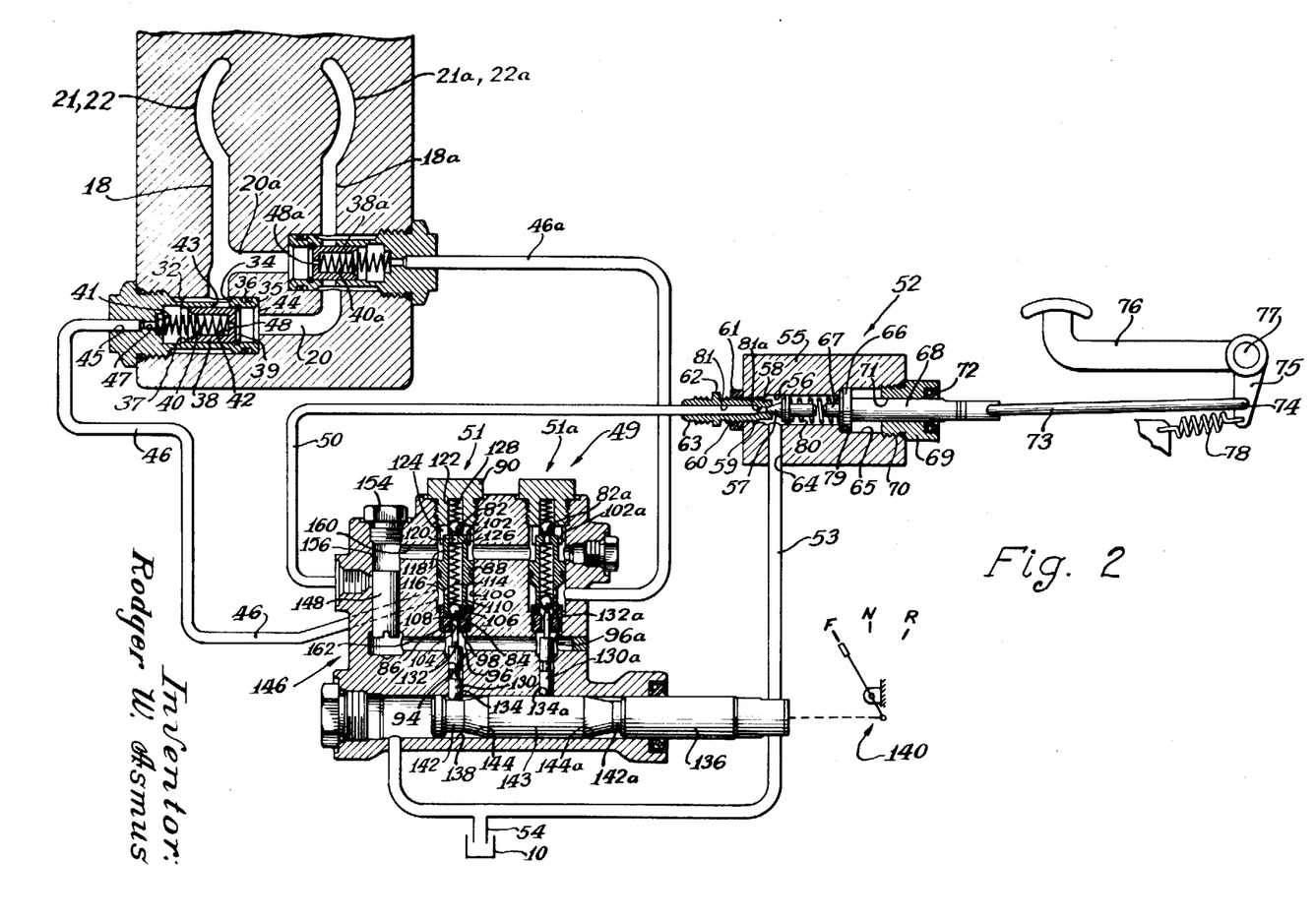
FIG. 2 is a generally sectional view, with portions thereof shown schematically, of the valving means employed in the hydrostatic transmission shown in the preceding view.

Since the high pressure relief valves 19, 19a are identical and of conventional construction, except for the remote pilot control thereof, only one thereof need be described in detail with comparable elements of the second such valve being designated by the same reference character plus the suffix "a. " As shown in FIG. 2, each such valve may include an outer sleeve-like body 31 threadably mounted in a bore 32 formed in a casing member such as 33 which may be constituted as a portion of the valve porting plate or center section of the motor-pump unit 15. Bore 32 has a portion 34 at the inner end thereof that receives a head portion 35 of the body 31. The head portion 35 is fitted with a fluid seal 36 to prevent flow of fluid between the member 33 and the portion 35. A bore 37 in body 31 slidably receives a sleeve valve 38 which normally abuts a snap ring 39 mounted in an annular recess in bore 37. A spring 40 compressibly disposed between an end wall 41 of body 31 and an end wall 42 of sleeve valve 38 continuously urges said sleeve valve 38 into abutting contact with snap ring 39. A plurality of radial openings 43 in body 31 communicate with the conduit or passage 18, while the open end 44 of said body 31 communicates with the conduit or passage 20. An axially extending opening 45 in the closed end of body 31 communicates with the pilot control conduit 46 while a reduced section portion 47 of said opening provides a restricting orifice, and a similar restricting orifice opening 48 coaxially aligned therewith is provided in the closed end wall 42 of sleeve valve member 38.

The control conduits or passages 46, 46a communicate with a valve assembly indicated generally by the reference numeral 49. Additional conduit or passage 50 communicatively connected to said valve assembly 49 connects with a feathering relief valve 52, the outlet of which discharges to the reservoir 10 by means of conduit 53 and an outlet conduit or passage 54.

The high pressure pilot and mechanically overrideably controlled feathering and relief valve unit 52 may include an outer casing or body member 55 having a central bore 56 therethrough which slidably receives a pilot poppet element 57, and an adjustable seat element 58 which is threadably secured by suitable thread means such as 59 in said bore. Additional thread means 60 cooperates with a lock nut 61 whereby said adjustable seat element may be securely fixed in any one of a plurality of positions in the casing 55 in order to compensate for manufacturing deviations. A hexagonal projection 62 on seat element 58 may be provided to facilitate movement of said adjustable seat element while a threaded coupling 63 is provided to couple the conduit 50 to the valve unit 52. An outlet opening 64 communicates with the interior of bore 56 and is connected by suitable conventional means with the conduit 53.

One end of bore 56 is fashioned with an enlarged bore portion 65 that slidably accommodates a plunger-like stop member 66 having a spring guide pin or stud 67 extending from one face thereof and a rod or stem 68 extending from an opposite face of said stop. A stop guide 69 threadably mounted as by the threads 70 in the enlarged bore portion 65 has an axial opening 71 that slidably accommodates the rod or stem 68 therein. A fluid seal 72 may be provided for well known purposes in the end of stop guide 69. Pivotally coupled to stem 68 is a push-pull rod 73 the opposite end of which is pivotally connected at 74 to an arm 75 of a foot pedal member 76 pivotally mounted at 77 by suitable means to a fixed support such as a portion of an associated vehicle (not shown). A return spring 78 interconnects the arm 75 also to the fixed support and as disposed constantly urges the pedal 76 to an up position and the stop 66 into engagement with the shoulder 79 formed by the juncture of the bore 56 and the enlarged bore portion 65. A spring 80 disposed between the poppet 57 and stop 66 normally urges said poppet into sealing engagement with the seat element 58. It will be noted that a small axially extending space is provided between the ends of the poppet stem and the spring guide pin 67 so as to permit limited movement of the poppet without displacing the spring stop 66.

An axial opening 81 in seat element 58 has a reduced section portion 81a therein that provides a restricting orifice for purposes which will presently be understood.

It still be seen that as pedal 76 is depressed, spring stop 66 is displaced thereby relieving the compressive reaction of spring 80 and permitting the fluid pressure in 81a to force poppet 57 off its seat and dump fluid into the reservoir 10 by way of conduits 53 and 54.

Valve assembly 49 includes two identical valve units, 51 and 51a, each of which is provided with a check valve 82, 82a and a low pressure relief valve 84, 84a. Since the valve units 51 and 51a are identical, only one unit will be described with comparable elements of the other being designated by the same reference numeral with the letter "a" suffixed thereto. The valve unit 51, for convenience of manufacture and assembly, is composed of three separate elements, viz., a seat member 86, a center or intermediate member 88 and a cap or plug member 90, which are mounted within the valve assembly 49 so that they function as a unitary structure. The body or casing 92 of the valve assembly 49 is drilled and counterbored to provide coaxially aligned bores 94, 96, 98, 100 and 102 of increasingly larger diameter. The seat element 86, which is provided with an opening 104 extending axially therethrough, is positioned in sealing engagement with the bore 98 and against the shoulder formed by the bores 96 and 98. A recess 106, to receive and position a protuberance 110 of reduced diameter on the center member 88, is formed in one end of the seat element 86. A ball seat 108, for engagement with the low pressure relief valve 84, is provided at the junction between the opening 104 and the recess 106. The center member 88 is positioned in sealing engagement with the bore 100. A cavity 112 is formed in the center member 88, which cavity slidably receives the ball relief valve 84 and which communicates with the opening 104. A spring 114 interposed between the bottom of cavity 112 and the relief valve 84 urges the latter into sealing engagement with the seat 108. An opening 116, extending radially through the side wall of the protuberance 110, permits fluid communication between the bore 100 and the cavity 112, and with the conduit 46 which intersects the bore 100. A reduced diameter extension 118 is formed on the upper end of the center member 88 and is provided with an axial opening 120, which defines a seat for the check valve 82. The plug member 90 is threadedly secured in the bore 102 and has a recess 122 for slidably receiving the check valve 82. A furcated extension 124 is formed on the lower end of the cap member 90, and permits fluid communication between the recess 122 and the bore 102, and between the bore 102 and the cavity 112 through opening 120. The furcated extension 124 is formed with a depression 126 to engage and position the extension 118. A spring 128 is interposed between the check valve 82 and the bottom of the recess 122 to urge the valve 82 into sealing engagement with the seat formed by the opening 120. The cap member 90 is appropriately sealed and, by threadedly engaging the bore 120, forces the three members 86, 88, and 90 into tight contact with each other so that they essentially become a unitary structure.

A plunger 130, while being suitably sealed against leakage, is mounted for slidable movement within the bore 94. A reduced diameter extension 132 is secured to one end of the plunger 130, and projects through the opening 104 so that, when forced upward, the low pressure relief valve 84 will be lifted from its seat 108 against the bias of spring 114. The lower end of the plunger 130 has a curved surface 134 and rests against a spool 136.

The spool 136 is slidably retained within a bore 138, and is operatively connected to a drive selector lever indicated schematically at 140. The spool is provided with reduced diameter sections 142 and 142a which are separated by and connect with a center, constant diameter section 143 by means of a transition camming surface 144 and 144a. The bores 94, 94a intersect the bore 138 so that the lower curved surfaces 134 and 134a of both plungers 130 and 130a are in contact with the spool 136. The axial distance between the reduced diameter sections 142 and 142a is sufficient, when the lever 140 is in N or neutral, to position both plungers 130 and 130a over the center section 143 in which plungers are elevated so that the lift pins 132 and 132a force the valves 84 and 84a off their seats. Moving the lever 140 to the F or forward drive position, as illustrated in FIG. 2, will permit the left-hand plunger 130 to drop into contact with the reduced section 142, thereby permitting the spring 114 to seat the valve 84, while the left-hand plunger 130a is retained in contact with the center section 143 wherein the lift pin 132a maintains the valve 84a in an open or unseated attitude. With the lever 140 in the R or reverse position, the plungers 130 and 130a are oriented oppositely to that of the forward position. The function of this arrangement will be explained hereinafter.

A blocking or anti-coast valve, indicated generally at 146, is also provided in the valve assembly 49. The anti-coast valve 146 comprises a spool 148 slidably retained within a bore 156. A plug member 154 is threadedly secured in and seals the bore 156.

A passage 160 provides fluid communication between the upper end of the bore 156 and the bores 102 and 102a. A similar passage 162 extends between the lower end of the bore 156 and the bores 96 and 96a. The conduit 50 communicates with the bore 156 at a point intermediate its intersection with the passages 160 and 162, and is arranged so that when the spool 148 is at the bottom of the bore 156, communication between passage 160 and the conduit 50 is complete or uninterrupted, but when moved upward the element 148 blocks the conduit 50 from communication with the bore 156.

OPERATION

The supply pump 12 provides charge fluid at a low pressure by way of conduit 14 to the motor-pump unit 15, and with said unit operating, the motor thereof being driven by fluid under pressure from the unit's pump, fluid is circulated around the transmission loop interconnecting said motor and pump of the unit. Under this condition, the fluid in the drive high pressure side of this loop becomes effective for actuating shuttle valve 24, moving it away from its normally centered position with the transmission in neutral, and moving it to the right or left depending on the tilted or displaced position of the swash plates in the motor-pump unit. At the same time the charge or low pressure side of said transmission loop operating at a lower pressure becomes effective to permit opening of the corresponding one of the check valves 17 or 17a to admit make-up or charge fluid from the respective one of the supply lines 16, 16a. With shuttle valve 24 open, conduit 27 serves to transfer fluid discharged thereinto from the motor-pump unit to other parts of the system for cooling and return to the fluid source. All of the above, of course, is the well known manner of operation for systems of this character. It will be understood that the tilt or displacement of the swash plates to provide forward, neutral or reverse positions of the transmission will be affected responsive to actuation of the speed and direction of movement control means or drive selector lever 140.

Assume, initially, a neutral position whereupon the lever 140 will be in neutral and the spool 116 will be centered in its neutral position, as illustrated in FIG. 1. This being the case, the lift pins 132 and 132a will have been moved upwardly to unseat the respective pressure relief valves 84 84a thus permitting charge fluid from supply pump 12 to circulate by way of conduits 16, 16a, check valves 17, 17a, conduits 18, 18a, valves 19, 19a and conduits 46, 46a through said pressure relief valves and passage 162, and by way of valves 82, 82a into conduit 50 to valve 52. In this instance since the pressure in conduit 50 is not sufficient to overcome spring 80 in the feathering valve 52, or the pedal return spring 78, the latter valve will remain closed. Under this condition, since the open valves 84, 84a allow a short circuit of the hydrostatic loop, both sides of the hydrostatic loop is subjected to charge pressure and is properly pre-conditioned for driving in either forward or reverse direction.

Next, assume a forward drive position, such as illustrated in FIG. 2 of the drawings, whereupon lever 140 will be moved to a forward position and spool 136 will have been slidably displaced axially rightwardly (as viewed herein) to permit plunger 130 to drop into engagement with reduced diameter section 142 thereby allowing ball valve 84 to be forced into engagement with its seat 108 by the spring 114. Since plunger 130a remains in engagement with the full diameter surface of spool 136, relief valve 84a remains open. In this position, kidney ports 21a, 22a will be subjected to drive fluid pressure while kidney ports 21, 22 will be subjected to charge fluid pressure. Drive fluid pressure is then carried past high pressure relief valve 19a and by way of passage 20 into high pressure relief valve 19 where a pilot pressure is transmitted through the latter valve by way of orifice openings 48 and 47 and passage 45 into conduit 46 and valve unit 51. This pilot pressure then aids spring 114 in retaining ball valve 84 seated and, by way of opening 120, displaces ball valve 82 from its seat, whereupon said pilot pressure is transmitted by way of passage 160, the upper portion of bore 156 and conduit 50 into the feathering valve 52. Since this pilot pressure ordinarily is not sufficient to unseat poppet 57 thereof the latter valve will remain closed thus permitting pilot pressure to be maintained in the system.

With the lever 140 disposed to provide reverse operation of the transmission, spool 136 will be axially disposed leftwardly, as viewed herein, whereupon valve 84 will be opened and valve 84a closed. Kidney ports 21, 22 will then be subjected to drive fluid pressure while kidney ports 21a 22a will be subjected to charge fluid pressure. The pilot pressure transmitted to the cavity 112a will unseat ball valve 82a. The feathering valve 52 will then be subjected to the pilot fluid pressure by way of passage 160, the opening in furcated extension 124, the upper portion of bore 156 and conduit 50. Thus the pilot poppet 57 will remain closed and the latter pressure maintained in the system.

With the lever 140 in forward drive position and the vehicle coasting down an incline or being pushed, the drive fluid pressure is switched from conduit 46 to conduit 46a because the drive motor 15b of motor-pump unit 15 becomes the pumping element and the hydraulic drive pump 15a becomes the motoring element. As the motoring pressure, i.e. that pressure being produced by motor 15b acting as a pump, builds up in kidney ports 22, 21 the torque output of the drive pump 15a, acting as a motor, increases and tends to overspeed or overdrive the engine or vehicle power plant to a point of damaging both said drive pump and engine. Under this condition, lift pin 132a holds the valve 84a in an open position, and motoring pressure acts through open valve 84a, the passage 162 and against the bottom of movable element 148 of the anti-coast valve 146. motoring pressure also acts against the top of the element 148, the pressure having unseated the ball valve 82a. When the pedal 76 is depressed or when the pressure exceeds the force of the spring 80, valve 52 will open permitting flow through the latter valve to conduits 53 and 54 and into the reservoir 10. As flow is established therethrough, a pressure drop across valve 82a results. The higher pressure acting against the bottom of the element 148 causes it to shift upward and block the outlet to conduit 50. With conduit 50 blocked, flow to the reservoir 10 is prohibited and overspeeding of the engine prevented. The fact that the conduit 50 is blocked when the pedal 76 is depressed, under these conditions, prevents the operator from inadvertently damaging the engine. However, the pressure increase created by the vehicle coasting and the motor 15b acting as a pump could damage the motor-pump unit 15. The present invention precludes such an occurrence in the following manner. If the pressure becomes too high, the ball valve 84 will be unseated, thus establishing a small flow from the conduit 46a to the conduit 46 to short circuit or bypass a portion of the fluid between opposite sides of the hydrostatic loop. The flow through conduit 46a creates a pressure drop across orifice 48a. Hence, the pressure on the upstream side of sleeve valve 38a is higher than the pressure on the downstream side. The sleeve valve 38a will then shift against the bias of spring 40a, opening the conduit 20a, and thereby permitting a large volume bypass of fluid in the hydrostatic loop. Thus the pressure input to the pump is limited and overspeeding is prevented while still maintaining a condition wherein dynamic braking may be effectively utilized. It will be appreciated that a similar sequence of events will be repeated if motoring pressure is built up when the transmission is conditioned fro reverse movement by placing the control lever in its reverse drive position.

The high pressure pilot and mechanically overridable feathering and relief valve unit 52 provides feathering action during normal driving operation that is somewhat comparable to a clutch in that it permits the gradual opening and closing of the pressure side of the hydrostatic loop by selectively depressing and releasing pedal 76. This dumping type action permits disrupting the power flow from the hydraulic drive pump to the hydraulic drive motor in the hydrostatic loop which thereby removes driving torque from the wheels of the vehicle while maintaining dynamic braking. A similar feathering action may be automatically operative during normal driving operation upon development of excess pressure in the hydrostatic loop when such pressure becomes sufficiently high to open pilot poppet 57 against the reaction of spring 80 to dump fluid by way of conduit 53 to reservoir 10 without actuation of the pedal 76. Then upon release of the abnormal pressure the circuit returns to normal. On the other hand, in event of a panic situation the pedal 76 may be rapidly depressed to quickly dump fluid to the reservoir to prevent excessive pressure buildup, thus providing a mechanical override for a high-pressure pilot valve for the drive pressure side of a hydrostatic transmission, and constituting a safety feature for the device. The pedal 76 when depressed may also provide an additional neutral position for the transmission, because when so depressed there can be no pressure buildup in the hydrostatic loop such as is necessary to effect a transmission of power through the motor pump unit.

It will be apparent that the present invention advantageously provides in a hydraulic system for controlling a hydrostatic transmission an improved arrangement whereby overspeeding of the transmission and possible damaging effects thereto may be avoided. It also provides means whereby disengagement of drive through the transmission will be prevented when the vehicle is in a coasting situation. In addition, dynamic braking effect will be preserved even when the hydraulic fluid is vented from the hydrostatic transmission to prevent overspeeding of the transmission motor.

While a preferred embodiment of the invention has been specifically disclosed herein, it is to be understood that the invention is not limited thereto as other variations will be apparent to those skilled in the art and the invention is to be given its fullest possible interpretation within the terms of the following claims.

What is claimed is:

1. In a hydrostatic transmission system having a variable displacement pump and motor hydraulically interconnected to form a closed circuit unit for transmitting power therethrough, a reservoir source of fluid at charge pressure and speed and direction of movement control means connected to said unit and movable in opposite directions from a neutral center position for controlling displacement of said pump and motor unit to selectively produce forward and reverse direction of drive for said motor when the power flow is from the pump to the motor of said unit, the combination comprising:

means to limit overspeeding of said transmission when the direction of the power flow through said unit is reversed, including a pair of high pressure pilot-operated relief valves communicatively connected across said closed circuit and normally closed to fluid flow between opposite sides of said closed circuit but each of which is operable responsive to development of a pressure differential thereacross for short-circuiting fluid flow between opposite sides of said circuit;

low pressure valve means;

high pressure pilot valve means;

the low pressure means and high pressure pilot valve means being connected in series and communicatively interposed between said high pressure valves and said reservoir;

valve positioning means adapted to be operatively associated with said control means for prepositioning the low pressure valve means into positions corresponding to the positions of said control means;

the low pressure valve means being operatively responsive, when the said direction of power flow through the transmission is reversed, to an increase of fluid pressure in said circuit for short-circuiting a portion of the fluid flow therein between opposite sides of said circuit and concomitant therewith opening at least one of the high pressure pilot operated valves to effect a short-circuiting of the remainder of the fluid flow in said circuit between opposite sides thereof to disrupt the flow of power through said unit; and anti-coast valve means arranged to block communication to said high pressure pilot valve means under predetermined pressure conditions when the direction of power flow through the transmission is reversed to thereby prevent overspeeding.

2. In a hydrostatic transmission system according to claim 1, wherein:

said anti-coast valve means is interposed between said low pressure valve means and said high pressure pilot valve means.

3. In a hydrostatic transmission system according to claim 2, wherein:

said anti-coast valve is a slidable spool valve reciprocably disposed in a bore and adapted to have fluid pressure exerted on each end thereof to move said anti-coast valve between open and closed positions; and pressure drop check valve means to reduce the fluid pressure on one end of said spool valve in response to establishing flow to the reservoir to move said anti-coast valve to closed position.

4. In a hydrostatic transmission system according to claim 1, wherein:

said low pressure valve means includes a pair of low pressure relief valves adapted to be prepositionable by said valve positioning means into a plurality of positions including a neutral position wherein both the said valves are open, another position corresponding to the forward direction of drive position of the said motor wherein one of the said valves is opened and the other thereof closed, and a further position corresponding to the reverse direction of drive position of the said motor wherein the said other one of the said valves is open while the said one of the said valves is closed.

5. In a hydrostatic transmission system according to claim 4, wherein:

said low pressure valve means additionally includes a pair of check valves, each of which is communicatively interposed between a respective one of said low pressure relief valves and the said high pressure pilot valve means.

6. In a hydrostatic transmission system according to claim 4, wherein:

said low pressure means additionally includes a pair of check valves one each of which is communicatively interposed between a respective one of said low pressure relief valves and said anti-coast valve means.

7. In a hydrostatic transmission system according to claim 1, wherein:

said high pressure pilot valve means includes a pilot poppet element and resilient means normally biasing said poppet to a closed position, and overriding means operable upon application of a controlled external force to permit the opening of said poppet to thereby release fluid pressure from said closed circuit to said reservoir, said anti-coast valve in its closed position being effective to prevent release of fluid pressure from said closed circuit to said reservoir when said poppet element is opened by said overriding means.

8. In a hydrostatic transmission system having a variable displacement pump and motor hydraulically interconnected to form a closed circuit unit for transmitting power therethrough, a reservoir source of fluid, and speed and direction of movement control means connected to said unit and movable in opposite directions from a neutral center position for controlling displacement of said pump and motor unit to selectively produce forward and reverse direction of drive of said motor when the power flow is from the pump to the motor of said unit, the combination therewith, comprising:

a pair of high pressure pilot-operated relief valves communicatively connected across opposite sides of said circuit and normally closed to fluid flow between opposite sides of said circuit;

each of said relief valves being operable responsive to development of a pressure differential thereacross for short-circuiting fluid flow between opposite sides of said closed circuit;

said relief valves being fashioned to provide pilot pressure passages therein open to fluid pressures in opposite sides of said circuit;

low pressure valve means;

high pressure pilot valve means;

first fluid passage means connecting said low pressure valve means and high pressure pilot means in series and connecting said latter means to said reservoir source of fluid;

second fluid passage means connecting said low pressure valve means into said pilot pressure passages whereby said low pressure valve means are selectively subjectable to pilot pressures from opposite sides of said circuit;

valve positioning means adapted to be operatively connected with said control means for presetting said low pressure valve means into positions corresponding to the said positions of said control means, said low pressure valve means being normally closed to the flow the flow of pilot pressure therethrough between opposite sides of said closed circuit when power flow is from the pump to the motor of said unit but being operatively responsive when the power flow is from the motor to the pump of said unit to an increase of pilot pressure for short-circuiting a portion of the fluid flow therein between opposite sides of said closed circuit and incident thereto opening a corresponding one of said high pressure pilot operated valves to effect a short-circuiting of the remainder of the fluid flow in said circuit between opposite sides thereof, whereby the flow of power through said unit is disrupted; and anti-coast valve means disposed in said fluid passage means connecting said low pressure valve means into said pilot pressure passages;

said anti-caost valve means being responsive to pressure developed when the power flow is from the motor to the pump to block flow to said high pressure pilot valve means whereby dynamic braking is effective.

9. In a hydrostatic transmission system having a pump and motor hydraulically interconnected to form a closed circuit unit for transmitting power therethrough at least one of said pump and motor having a variable displacement, a reservoir source of fluid at charge pressure and speed and direction of movement control means connected to said one of said pump and motor and movable in opposite directions from a neutral center position for controlling displacement of said one of said pump and motor to selectively produce forward and reverse direction of drive for said motor when the power flow is from the pump to the motor of said unit, the combination comprising:

means to limit overspeeding of said transmission when the direction of the power flow through said unit is reversed, including a pair of high pressure pilot-operated relief valves communicatively connected across said closed circuit and normally closed to fluid flow between opposite sides of said closed circuit but each of which is operable responsive to development of a pressure differential thereacross for short-circuiting fluid flow between opposite sides of said circuit;

low pressure valve means;

high pressure pilot valve means;

the low pressure means and high pressure pilot valve means being connected in series and communicatively interposed between said high pressure valves and said reservoir;

valve positioning means adapted to be operatively associated with said control means for prepositioning the low pressure valve means into positions corresponding to the positions of said control means;

the low pressure valve means being operatively responsive, when the said direction of power flow through the transmission is reversed, to an increase of fluid pressure in said circuit for short-circuiting a portion of the fluid flow therein between opposite sides of said circuit and concomitant therewith opening at least one of the high pressure pilot-operated valves to effect a short-circuiting of the remainder of the fluid flow in said circuit between opposite sides thereof to disrupt the flow of power through said unit; and anti-coast valve means arranged to block communication to said high pressure pilot valve means under predetermined pressure conditions when the direction of power flow through the transmission is reversed to thereby prevent overspeeding.

10. In a hydrostatic transmission system according to claim 9, wherein:

said anti-coast valve means is interposed between said low pressure valve means and said high pressure pilot valve means.

11. In a hydrostatic transmission system according to claim 10, wherein:
said anti-coast valve is a slidable spool valve reciprocably disposed in a bore and adapted to have fluid pressure exerted on each end thereof to move said anti-coast valve between open and closed positions; and
pressure drop check valve means to reduce the fluid pressure on one end of said spool valve in response to establishing flow to the reservoir to move said anti-coast valve to closed position.

12. In a hydrostatic transmission system according to claim 9, wherein:
said low pressure valve means includes a pair of low pressure relief valves adapted to be prepositionable by said valve positioning means into a plurality of positions including a neutral position wherein both the said valves are open, another position corresponding to the forward direction of drive position of the said motor wherein one of the said valves is opened and the other thereof closed, and a further position corresponding to the reverse direction of drive position of the said motor wherein the said other one of the said valves is open while the said one of the said valves is closed.

13. In a hydrostatic transmission system according to claim 12, wherein:
said low pressure valve means additionally includes a pair of check valves, each of which is communicatively interposed between a respective one of said low pressure relief valves and the said high pressure pilot valve means.

14. In a hydrostatic transmission system according to claim 12, wherein:
said low pressure valve means additionally includes a pair of check valves one each of which is communicatively interposed between a respective one of said low pressure relief valves and said anti-coast valve means.

15. In a hydrostatic transmission system according to claim 9, wherein:
said high pressure pilot valve means includes a pilot poppet element and resilient means normally biasing said poppet to a closed position, and overriding means operable upon application of a controlled external force to permit the opening of said poppet to thereby release fluid pressure from said closed circuit to said reservoir, said anti-coast valve in its closed position being effective to prevent release of fluid pressure from said closed circuit to said reservoir when said poppet element is opened by said overriding means.

16. In a hydrostatic transmission system having a pump and motor hydraulically interconnected to form a closed circuit unit for transmitting power therethrough, at least one of said pump and motor having a variable displacement, a reservoir source of fluid, and speed and direction of movement control means connected to said one of said pump and motor and movable in opposite directions from a neutral center position for controlling displacement of said one of said pump and motor to selectively produce forward and reverse direction of drive of said motor when the power flow is from the pump to the motor of said unit, the combination therewith, comprising:
a pair of high pressure pilot-operated relief valves communicatively connected across opposite sides of said circuit and normally closed to fluid flow between opposite sides of said circuit;
each of said relief valves being operable responsive to development of a pressure differential thereacross for short-circuiting fluid flow between opposite sides of said closed circuit;
said relief valves being fashioned to provide pilot pressure passages therein open to fluid pressures in opposite sides of said circuit;
low pressure valve means;
high pressure pilot valve means;
first fluid passage means connecting said low pressure valve means and high pressure pilot means in series and connecting said latter means to said reservoir source of fluid;
second fluid passage means connecting said low pressure valve means into said pilot pressure passages whereby said low pressure valve means are selectively subjectable to pilot pressures from opposite sides of said circuit;
valve positioning means adapted to be operatively connected with said control means for pre-setting said low pressure valve means into positions corresponding to the said positions of said control means, said low pressure valve means being normally closed to the flow of pilot pressure therethrough between opposite sides of said closed circuit when power flow is from the pump to the motor of said unit but being operatively responsive when the power flow is from the motor to the pump of said unit to an increase of pilot pressure for short-circuiting a portion of the fluid flow therein between opposite sides of said closed circuit and incident thereto opening a corresponding one of said high pressure pilot operated valves to effect a short-circuiting of the remainder of the fluid flow in said circuit between opposite sides thereof, whereby the flow of power through said unit is disrupted; and
anti-coast valve means disposed in said fluid passage means connecting said low pressure valve means into said pilot pressure passages;
said anti-coast valve means being responsive to pressure developed when the power flow is from the motor to the pump to block flow to said high pressure pilot valve means whereby dynamic braking is effective.

17. A control system for a hydrostatic transmission having pump and motor units, said pump unit being adapted to be connected to a power input means with hydraulic interconnections between said pump and motor units, an improved control system comprising:
a. means for controlling the flow of power from said motor unit to said pump unit so as to provide acceptable dynamic braking of the transmission and the power input means,
b. control means for hydraulically disconnecting the pump from the motor unit so as to obtain variable output from said motor unit, and
c. means for precluding said control means from effecting such disconnection in the event of power flow from the motor unit to the pump unit.

18. An apparatus as recited in claim 17 in which:
a. said means for controlling the flow of power from said motor unit to said pump unit comprises high pressure relief valves for short circuiting fluid between said hydraulic interconnections and low pressure relief valves for controllably opening said high pressure relief valves under dynamic braking conditions to effect same.

19. An apparatus as recited in claim 17 in which said control means comprises:
a. pilot controlled valve means for short circuiting fluid between said interconnections,
b. manually operated pilot valve for actuating said pilot controlled valve means,
c. blocking valve means for precluding the actuation of said pilot valve means in the event of power flow from said motor unit to said pump unit.

20. A control system for a transmission having a pump unit and motor unit and a hydraulic interconnection between same for transmitting power between said units, an improved control means comprising:
a. means associated with said hydraulic interconnection for limiting power transmission from said motor unit to said pump unit so as to permit dynamic braking of the transmission while minimizing overspeed conditions,
b. feathering control means associated with said transmission for interrupting power transmission from said pump to said motor, and
c. means for precluding said feathering control means from effecting interruption of power transmission from said motor to said pump.

21. A control system for a transmission having a pump unit and a motor unit and a hydraulic interconnection between same for transmitting power between said units, an improved control means comprising:
a. means associated with said hydraulic interconnection for limiting power transmission from said motor unit to said pump unit so as to permit dynamic braking of the transmission,
b. feathering control valve means associated with said transmission for interrupting transmission of power between said pump and said motor, and
c. anti-coast means operatively associated with said feathering control valve means for overriding same so as to preclude any interruption of power transmission from said motor to said pump, and to ensure the continued existence of dynamic braking under such a condition of power flow.

22. A control system for a transmission having hydraulic pump and motor units, said pump unit being adapted for connection to a power input means and said motor unit adapted for interconnection to a power output means, with hydraulic interconnections between said pump and motor units for transmitting power flow in either direction, the improved control system comprising:
a. means for controlling power flow from said motor to said pump so as to preclude overspeed conditions of the power input means or the transmission,
b. control means capable of disconnecting said pump from said motor unit when power flow is from the pump to the motor and incapable of such disconnection in the event of power flow from the motor unit to the pump unit.

23. An apparatus as recited in claim 22 in which said control means for disconnecting said pump and motor units comprise:
a. high pressure relief valves associated with said hydraulic interconnections for bypassing fluid therebetween,
b. manually operated pilot valve means for actuating said relief valves, and
c. means for overriding said pilot means in the event of power flow from said motor to said pump.

* * * * *